(12) United States Patent
Heurtier et al.

(10) Patent No.: US 10,243,356 B2
(45) Date of Patent: *Mar. 26, 2019

(54) OVERVOLTAGE PROTECTION DEVICE

(71) Applicant: STMICROELECTRONICS (TOURS) SAS, Tours (FR)

(72) Inventors: Jérôme Heurtier, Tours (FR); Guillaume Bougrine, Tours (FR); Mathieu Rouviere, Tours (FR)

(73) Assignee: STMicroelectronics (TOURS) SAS, Tours (FR)

( * ) Notice: Subject to any disclaimer, the term of this patent is extended or adjusted under 35 U.S.C. 154(b) by 528 days.

This patent is subject to a terminal disclaimer.

(21) Appl. No.: 14/925,001

(22) Filed: Oct. 28, 2015

(65) Prior Publication Data

US 2016/0276826 A1 Sep. 22, 2016

(30) Foreign Application Priority Data

Mar. 19, 2015 (FR) ...................... 15 52260

(51) Int. Cl.
H02H 9/00 (2006.01)
H02H 9/04 (2006.01)

(52) U.S. Cl.
CPC .............. *H02H 9/04* (2013.01); *H02H 9/041* (2013.01); *H02H 9/042* (2013.01); *H02H 9/043* (2013.01)

(58) Field of Classification Search
CPC ........................................................ H02H 9/04
See application file for complete search history.

(56) References Cited

U.S. PATENT DOCUMENTS

| 4,651,251 | A | * | 3/1987 | Thiele | ................ H03K 17/0824 327/465 |
| 4,656,554 | A | * | 4/1987 | Maschek | ................ G01R 15/08 343/DIG. 1 |
| 5,233,497 | A | | 8/1993 | Bremond et al. | |
| 6,226,166 | B1 | | 5/2001 | Gumley et al. | |
| 6,707,171 | B1 | * | 3/2004 | Huenner | ................ B60L 3/00 307/113 |
| 9,531,187 | B2 | * | 12/2016 | Heurtier | ................ H02H 9/04 |
| 2014/0293493 | A1 | | 10/2014 | Heurtier et al. | |

FOREIGN PATENT DOCUMENTS

| CN | 101252278 A | 8/2008 |
| CN | 203826923 U | 9/2014 |
| CN | 104078925 A | 10/2014 |
| CN | 205265251 U | 5/2016 |
| FR | 2626115 A1 | 7/1989 |
| SU | 1181050 A2 | 9/1985 |

* cited by examiner

Primary Examiner — Stephen W Jackson
(74) Attorney, Agent, or Firm — Slater Matsil, LLP

(57) ABSTRACT

A device may be for protection against overvoltages in a power supply line. The device may include a breakover diode, an avalanche diode coupled in series with the breakover diode, and a switch coupled in parallel with the breakover diode and the avalanche diode. The device may also include a circuit coupled across the avalanche diode and configured to control the switch.

20 Claims, 3 Drawing Sheets

OVERVOLTAGE PROTECTION DEVICE

RELATED APPLICATION

This application is based upon prior filed copending French Application No. 1552260, filed Mar. 19, 2015, the entire subject matter of which is incorporated herein by reference in its entirety.

TECHNICAL FIELD

The present disclosure relates to a device for protection against overvoltages, and more specifically, a device for protection against overvoltages in a power supply line.

BACKGROUND

An overvoltage protection component is a component that turns on when the voltage across it exceeds a given threshold, i.e. a breakdown voltage and generally designated as VBR. A first type of protection component is an avalanche diode type, with a current-voltage characteristic illustrated in FIG. 1. When the voltage across this component exceeds breakdown voltage VBR, the component becomes conductive. Ideally, the voltage across the component remains equal to VBR while the current increases. Indeed, as shown in FIG. 1, the characteristic is not vertical and the voltage across the component exceeds value VBR while the overvoltage is absorbed, i.e. a current I of strong value crosses the component.

A disadvantage of this type of component is that during the overvoltage absorption phase, the voltage across the component remains greater than or equal to breakdown voltage VBR, i.e. during this phase, the component has to absorb a power greater than VBR×I. This results in having to form a component of sufficiently large size, on the one hand, to minimize its internal resistance and thus the voltage there across during the overvoltage removal phase and, on the other hand, so that it can absorb the power associated with the overvoltage without being destroyed. Currently, for voltages VBR greater than 100 volts, for example, on the order of 300 volts, this results in component sizes greater than several cm$^2$, for example, on the order of 10 cm$^2$. Such components are however made in the form of a stack of diode chips, for example, a stack of fourteen elementary components, each having a surface area of 8.6×8.6 mm$^2$ to reach a 430-V breakdown voltage. Such components may be expensive and bulky.

A second type of protection component is of breakover type, i.e. a Shockley diode type, or a gateless thyristor type. The current-voltage characteristic of a breakover component is illustrated in FIG. 2. When the voltage across the component exceeds breakdown voltage VBR, this voltage rapidly drops and then follows a substantially vertical characteristic 1.

An advantage of this second type of component may be that the power dissipated by the overvoltage in the component is low as compared with the power dissipated in a device of avalanche diode type, given that the voltage across the component is very low during the overcurrent flow. A disadvantage of this second type of component may be that, as long as there is a significant voltage across the component, the component remains on, the protection component only turning back off if the voltage across is such that the current in this component becomes smaller than a hold current Ih. For a protection component having its breakdown voltage VBR ranging from 50 to 1,000 volts, this hold current currently has a value in the range from 100 mA to 1 A according to the breakdown voltage of the component.

Accordingly, breakover type protection components may be reserved for circuits where these components are intended to protect a line having an operating voltage crossing zero values—this being true, in particular, for a data transmission line. As illustrated in FIG. 3, if a line L1 forming a power supply line connected to the output of a power supply device, such as a solar plant 10, for example, connected to an inverter 12, is desired to be protected, a breakover protection component can normally not be used since, after the occurrence of an overvoltage, for example, corresponding to a strike of lightning on line L1, the potential on line L1 remains positive and the protection component remains conductive.

As illustrated in FIG. 4A, after application of the overvoltage, voltage VDC at the output of power supply source 10 is short-circuited and a short-circuit current Isc flows therethrough. The source sees, between its terminals, internal resistance Ri and on-state resistance RD of the protection diode. A voltage VD=VDC(RD/(Ri+RD)) then exists across the protection diode.

FIG. 4B shows a portion of the characteristic curve of the diode corresponding to this specific case. In most practical configurations, potential VD corresponding to short-circuit current Isc is much greater than potential Vh corresponding to hold current Ih of the breakover component. As an example, for a 150-mA hold current Ih, voltage Vh may be in the order of 2 V. It is thus not possible, in principle, to use a breakover component to protect a direct current (DC) power supply line. Protection devices of avalanche diode type, which should have significant surface areas and thus a high cost, thus have to be formed.

FIG. 5 illustrates an example of a protection device. This device is described in French patent application No. 1352864 (and in the corresponding United States Patent Application Publication No. 2014/0293493), which is incorporated herein by reference in its entirety. The device comprises, between two terminals A and B, the parallel assembly of a breakover type protection diode D, a switch SW, and a circuit CONTROL for controlling switch SW.

Protection device of FIG. 5 operates as follows. In the idle state, switch SW is off. Terminals A and B are connected across a DC power supply line so that the protection is for example connected like diode D of FIG. 3. As long as the voltage between terminals AB remains lower than the breakdown voltage of breakover diode D, the protection device is non-conductive. When an overvoltage appears, the protection diode becomes conductive, which results in the configuration of FIG. 4A, that is, the power supply connected between terminals AB is shorted. Once the overvoltage has passed, diode D conducts a short-circuit current Isc such as defined in relation with FIG. 4A. At this time, the switch SW is turned on so that the current between terminals A and B is branched by switch SW. If on-state resistance Ron of switch SW is sufficiently low, and in particular if condition Ron×Isc<Vh is respected, the voltage between terminals AB becomes lower than voltage Vh, and breakover diode D blocks. Switch SW can then be turned back off.

According to a first approach, the control circuit comprises an overvoltage detector and automatically turns on switch SW for a determined time period, sometime after the overvoltage will have been detected, and then turns off switch SW after a determined time. According to another approach, the control circuit comprises circuitry for detecting the voltage across diode D. As long as this voltage is lower than VBR and higher than VD, the control circuit will remain inactive. Then, after a first voltage drop, the control circuit will determine whether the voltage across diode D is within a given range, corresponding to value VDC(RD/(Ri+RD)). The control circuit then determines the turning on and the turning off of switch SW.

The operation of the circuit of FIG. 5 is based on the fact that, when switch SW is in the conductive state, the voltage there across drops sufficiently to become lower than previously-defined value Vh. This implies that on-state resistance Ron of switch SW should be much lower than apparent resistance RD of diode D when the device is shorted. It should be understood that this makes it necessary to use a switch with a very low Ron, which is not always compatible with the desire to use low-cost switches, for example, small MOS transistors.

FIG. 6 illustrates an alternative approach of the device of FIG. 5, which may overcome this disadvantage. In FIG. 6, the protection further comprises, in series with breakover diode D between terminals A and B, an avalanche diode d having a breakdown voltage Vbr much smaller than breakdown voltage VBR of breakover diode D. The operation of the series assembly of breakover diode D and of avalanche diode d differs little, in terms of overvoltage absorption, from the operation of diode D alone. This time, when the overvoltage has passed and the line is shorted, condition Ron×Isc<Vh+Vbr just has to be satisfied, which enables to use a switch having a higher Ron than in the case of the assembly of FIG. 5.

SUMMARY

A device may be for protection against overvoltages in a power supply line. The device may include a breakover diode, an avalanche diode coupled in series with the breakover diode, and a switch coupled in parallel with the breakover diode and the avalanche diode. The device may also include a circuit coupled across the avalanche diode and configured to control the switch.

DETAILED DESCRIPTION

Figure 1:
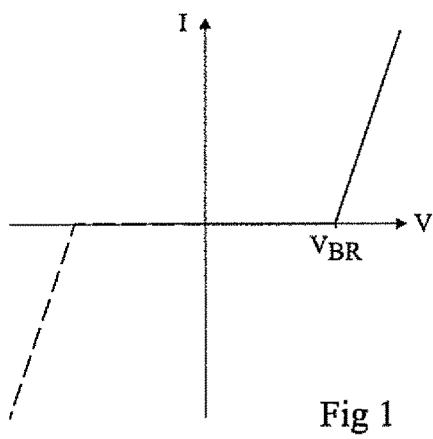
FIG. 1 shows the current-voltage characteristic of a protection device of the avalanche diode type, according to the prior art.

The same elements have been designated with the same reference numerals in the different drawings. Further, in the present description, term "connected" is used to designate a direct electric connection, with no intermediate electronic component, for example, by way of one or a plurality of conductive tracks, and term "coupled" or term "linked" is used to designate either a direct electric connection (then meaning "connected") or a connection via one or a plurality of intermediate components (resistor, capacitor, etc.). The foregoing and other features and advantages will be discussed in detail in the following non-limiting description of specific embodiments in connection with the accompanying drawings Generally speaking, an embodiment provides a method of protection against overvoltages capable of protecting a power supply line, comprising a first branch comprising a breakover diode in series with an avalanche diode, a switch controlled in parallel with the first branch, and a circuit for controlling the switch connected across the avalanche diode. The breakdown voltage of the avalanche diode is at least ten times smaller than the breakdown voltage of the breakover diode.

Also, the breakdown voltage of the breakover diode may be in the range from 20 to 1,500 V. The switch may be a MOS transistor or an insulated-gate bipolar transistor. The control circuit may comprise a first resistor connected in parallel with the avalanche diode, the end of the first resistor connected to the midpoint of the first branch being further connected to a control node of the switch.

Moreover, the end of the first resistor may be connected to the midpoint of the first branch is connected to the control node of the switch. The end of the first resistor connected to the midpoint of the first branch may be connected to the control node of the switch via a second resistor. Additionally, the control node of the switch may be connected to the other end of the first resistor via a capacitor. A diode may be connected in parallel with the second resistor.

Figure 5:
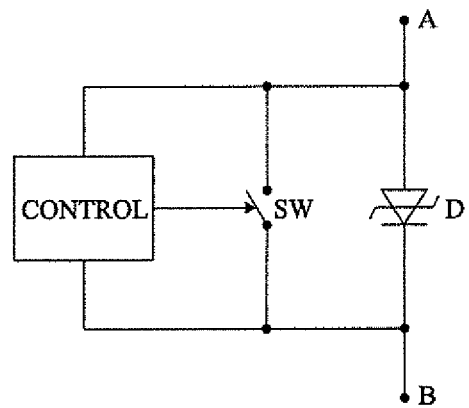
FIG. 5 shows an example of an overvoltage protection device, according to the prior art.
Figure 6:
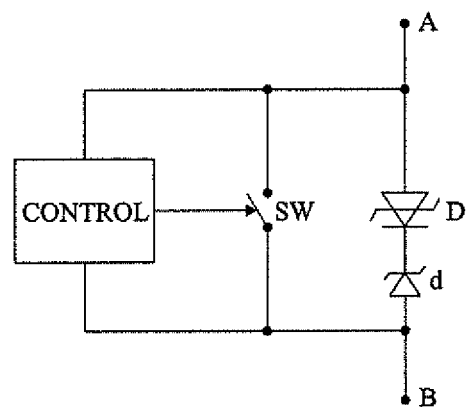
FIG. 6 shows a variation of the protection device of FIG. 5.

In the devices of FIGS. 5 and 6, the control circuit CONTROL of switch SW is connected, on the one hand, to terminals A and B of the branch comprising breakover diode D and, on the other hand, to a control node or terminal of switch SW. The control circuit controls switch SW according to the voltage between nodes A and B. The control circuit may comprise a processor or another logic circuit or programmer. Thus, the control circuit should comprise a high-voltage interface to withstand the line power supply voltage. Further, the control circuit should comprise a power storage capacitor to supply the logic circuits with a DC power supply voltage having a level lower than the line power supply voltage. In certain applications, for example, in a solar power plant, the line power supply voltage may be particularly high, typically in the order of several hundred volts. As a result, the circuit CONTROL for controlling switch SW is relatively expensive and bulky.

Figure 7:
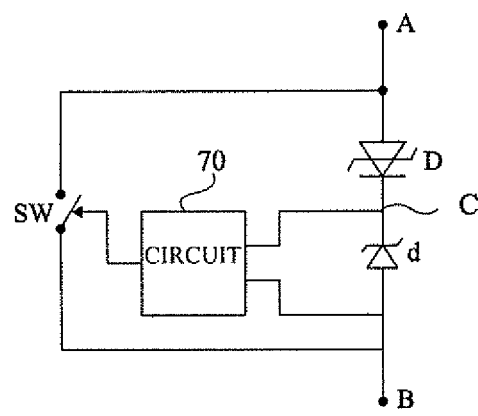
FIG. 7 shows an embodiment of an overvoltage protection device, according to the present disclosure.

FIG. 7 shows an embodiment of an overvoltage protection device. The device comprises, as in the example of FIG. 6, between two terminals A and B, the parallel assembly of a first branch comprising a breakover type protection diode D in series with an avalanche diode d, and a switch SW. Avalanche diode d has a breakdown voltage Vbr smaller than breakdown voltage VBR of breakover diode D. Preferably, the breakdown voltage Vbr of avalanche diode d is much lower, for example, at least ten times lower, than breakdown voltage VBR of the breakover diode. In the shown example, the breakover diode D has its anode connected to terminal A and its cathode connected to a node or a terminal C of the first branch. Avalanche diode d has its cathode connected to node C and its anode connected to terminal B. As an example, the breakover diode D has a breakdown voltage in the range from 20 to 1,500 V.

The switch SW, for example is, a metal-oxide semiconductor (MOS) transistor or an Insulated Gate Bipolar Transistor" (IGBT). As an example, the switch SW is a PNP-type IGBT having its collector connected to terminal A and having its emitter connected to terminal B.

The protection device of FIG. 7 differs from the device of FIG. 6 in that the control circuit CONTROL of the device of FIG. 6, connected between terminals A and B in the example of FIG. 6, is replaced with a circuit 70 connected on the one hand across avalanche diode d (that is, to nodes C and B in this example), and on the other hand to a terminal or to a control node of switch SW. Thus, in the embodiment of FIG. 7, the control circuit 70 of switch SW is not connected to terminals A and B of connection of the protection device to the power supply line.

The operation of the protection device of FIG. 7 is similar to that of the device of FIG. 6, with the difference that instead of controlling switch SW according to the voltage between terminals A and B, control circuit 70 controls switch SW according to the voltage across avalanche diode d. An advantage of the embodiment of FIG. 7 is that the control circuit can be considerably simplified as compared with the control circuit of the devices of FIGS. 5 and 6.

Figure 8:
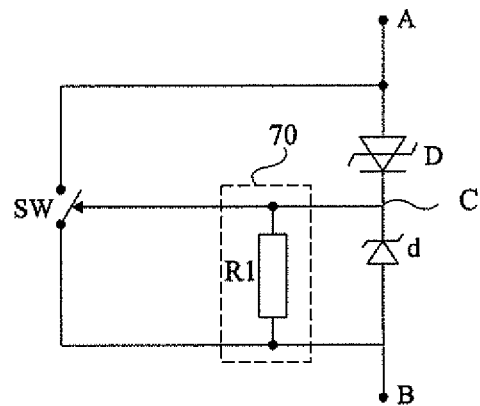
FIG. 8 shows an example of the device of FIG. 7, according to the present disclosure.

FIG. 8 shows an embodiment of control circuit 70 of the protection device of FIG. 7. In the example of FIG. 8, the circuit 70 is reduced to a resistor R1 connected between nodes C and B, in parallel with avalanche diode d. The end of resistor R1 connected to node C in the first branch and to the control gate of switch SW. Thus, in this example, the voltage across avalanche diode d is directly used to control switch SW. Resistance R1 is preferably much greater than the on-state resistance of avalanche diode d. As an example, the value of resistance R1 is in the range from 1 to 100 kΩ.

Protection device of FIG. 8 operates as follows. As long as the voltage between terminals A and B remains smaller than the breakdown voltage of breakover diode D, the protection device is non-conductive. Resistor R1 enables to take the potential of node C substantially to the potential of node B (for example, grounded), so that switch SW is off. When an overvoltage appears, breakover diode D and avalanche diode d become conductive and the power supply connected between terminals A and B is shorted. The voltage across avalanche diode d then switches from a zero value to a value substantially equal to Vbr, which turns on switch SW. Thus, switch SW turns on at the same time or almost at the same time as diodes D and d. The current associated with the overvoltage is shared between switch SW and the branch comprising diodes D and d. Switch SW absorbs what current it can absorb until it saturates, the rest (in practice, most of the current) being absorbed by diodes D and d. Once the overvoltage is over, the current flowing through the protection device decreases and becomes equal to short-circuit current ISC of the power supply. Switch SW is sized to be able to absorb all or the most part of this current, so that breakover diode D blocks. The potential of node C is then substantially taken to the potential of node B via resistor R1, and switches SW turns off. In practice, the switch SW may slightly turn off after breakover diode D due to the stray capacitance between its control gate and terminal B, which forms a circuit RC parallel to resistor R1.

Figure 9:
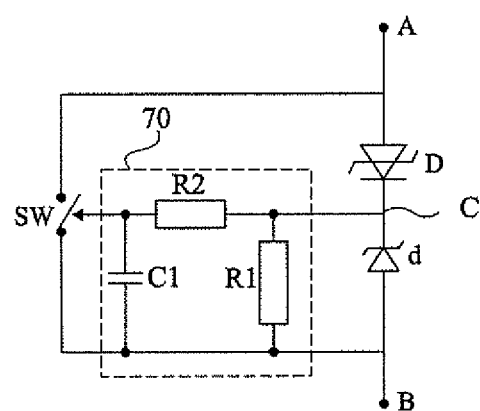
FIG. 9 shows another embodiment of the device of FIG. 7, according to the present disclosure.

FIG. 9 shows another embodiment of control circuit 70 of the protection device of FIG. 7. In the example of FIG. 9, the circuit 70 comprises the same resistor R1 as in the example of FIG. 8, and further comprises a circuit RC comprising a resistor R2 connecting the end of resistor R1 connected to node C to the control gate of switch SW, and a capacitor C1 connecting the control gate of switch SW to terminal B.

The operation of the device of FIG. 9 is similar to that of the device of FIG. 8, but differs from the operation described in relation with FIG. 8 in that, when an overvoltage appears, the switch is turned on with a delay relative to the turning-on of diodes D and d, such a delay being set by the RC circuit formed by resistor R2 and capacitor C1. Thus, at least part of the overvoltage may be removed by diodes D and d before switch SW is turned on. Once the overvoltage has passed and diode D is blocked, the switch SW turns off with a delay set by circuit RC.

Thus, the circuit of FIG. 9 enables to set a desired delay between the triggering of diodes D and d and the turning-on of switch SW, and between the blocking of diodes D and d and the turning-off of switch SW. As an example, the values of capacitance C1 and of resistance R2 are selected to obtain a time constant, and thus a delay between the triggering of the protection and the turning-on of switch SW, in the range from 5 to 100 µs, for example, approximately 20 ms. The capacitance of capacitor C1 is for example in the range from 20 nF to 2 µF, and resistance R2 for example has a value in the range from 10Ω to 1 kΩ.

As a variation, the capacitor C1 may be omitted. The delay between the triggering of the protection and the turning-on of switch SW is then set by circuit RC formed by resistor R2 and the intrinsic capacitance of switch SW between its control node and terminal B (for example, the gate-source capacitance in the case of a MOS transistor, or the gate-emitter capacitance in the case of an IGBT).

Figure 10:
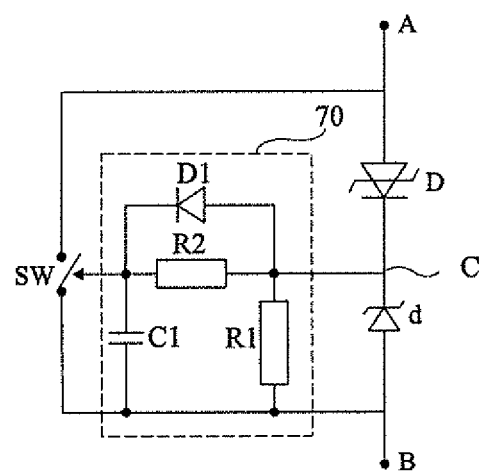
FIG. 10 shows another embodiment of the device of FIG. 7, according to the present disclosure.

FIG. 10 shows another embodiment of control circuit 70 of the protection device of FIG. 7. In the example of FIG. 10, the circuit 70 comprises the same elements as in the example of FIG. 9, and further comprises, in parallel with resistor R2, a diode D1 having its anode connected to node C and having its cathode connected to the control gate of switch SW.

The operation of the device of FIG. 10 is similar to that of the device of FIG. 9, but for the fact that, due to the presence of diode D1, the switch turns on substantially at the same time as diodes D and d when an overvoltage occurs. Thus, circuit RC delays the turning back off of switch SW at the end of an overvoltage, but does not delay its turning on at the beginning of an overvoltage.

Protection devices of the type described in relation with FIGS. 7 to 10 have the similar advantages to those of the devices of FIGS. 5 and 6. In particular, they enable to use a breakover diode having a relatively small surface area, for example, 50 mm$^2$, while, as indicated previously, for protection voltages greater than from approximately 50 to 1,000 volts, protection avalanche diodes should have surface areas approximately ranging from 1 to 10 cm$^2$. The assembly of switching device SW, for example, a MOS or IGBT transistor, and of the control circuit will, for example, have a surface area in the range from 10 to 15 mm$^2$ only. Thus, the total surface area of the protection device is smaller than 65 mm$^2$, while fulfilling the function of an avalanche protection component having a surface area in the range from 1 to 10 cm$^2$.

An additional advantage of the embodiments described in relation with FIGS. 7 to 10 is that due to the connection of control circuit 70 across avalanche diode d, the architecture of the control circuit may be considerably simplified with respect to the examples of FIGS. 5 and 6. In particular, a control circuit with no logic circuits, no programmer or processor, and with no supply power storage capacitor may be formed. Further, the described embodiments do not require accurately measuring the voltage or the current in the branch comprising diodes D and d.

Figure 2:
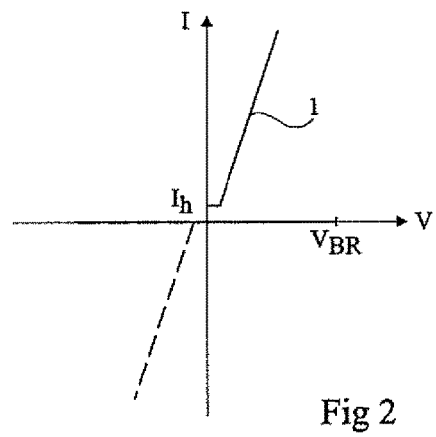
FIG. 2 shows the current-voltage characteristic of a protection device of the breakover type, according to the prior art.
Figure 3:
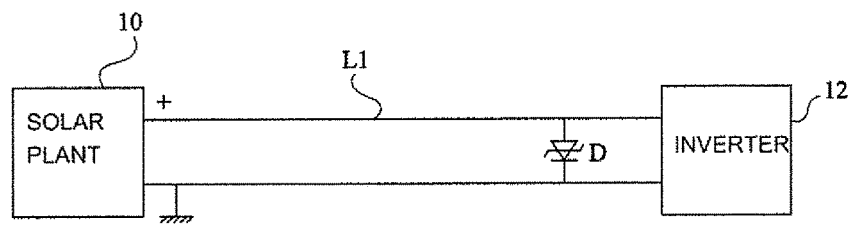
FIG. 3 shows a protection diode of the breakover type connected to a DC power supply line, according to the prior art.
Figure 4A:
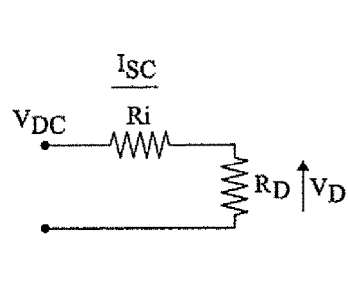
FIG. 4A shows an equivalent diagram of the assembly of FIG. 3 in a short-circuit state, according to the prior art.
Figure 4B:
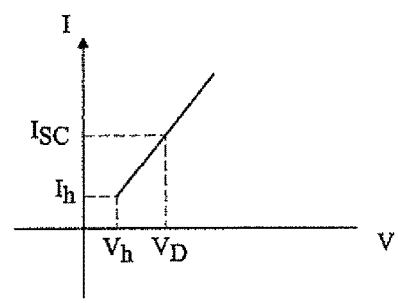
FIG. 4B shows the characteristic of a breakover device in the case of FIG. 4A.

Specific embodiments have been described. Various alterations, modifications, and improvements will readily occur to those skilled in the art. In particular, the described embodiments are not limited to the embodiments of control circuit 70 described in relation with FIGS. 8, 9, and 10. It will be within the abilities of those skilled in the art to adapt the described examples according to the targeted application, particularly to make tradeoffs in terms of sizing of switch SW, of breakover diode D, and of avalanche diode d. In particular, although examples of circuits 70 only formed of passive components have been described, active components such as transistors may be added to the control circuit of switch SW, particularly to more accurately control the turn-on and turn-off times of switch SW. Further, only one-way protection diodes have been described and shown in the drawings. Of course, bidirectional protection diodes (having their characteristics illustrated in FIGS. 1 and 2, although they have not been described) may also be provided.

Further, the use of the protection component in association with a line biased to a DC voltage only has been described. This component may also be used in the case where the line is an alternating current (AC) power supply line, for example, at 50 or 60 Hz. Indeed, if the overvoltage occurs at the beginning of a half wave, it may be desired for the protection diode to stop being conductive rapidly after the occurrence of an overvoltage without waiting for the end of a half wave, the duration of a half wave being 10 ms in the case of a power supply at 50 Hz.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

That which is claimed is:

1. A device for protection against overvoltages in a power supply line, the device comprising:
    a branch comprising a breakover diode, and an avalanche diode coupled in series with the breakover diode;
    a switch coupled in parallel with the branch; and
    a circuit coupled across the avalanche diode and configured to control the switch.

2. The device of claim 1 wherein the avalanche diode has a breakdown voltage at least ten times smaller than a breakdown voltage of the breakover diode.

3. The device of claim 2 wherein the breakdown voltage of the breakover diode is between 20 V and 1,500 V.

4. The device of claim 1 wherein the switch comprises at least one of a transistor and an insulated-gate bipolar transistor.

5. The device of claim 1 wherein the circuit comprises a first resistor coupled in parallel with the avalanche diode; and wherein a first end of the first resistor is coupled to a midpoint of the branch and a control node of the switch.

6. The device of claim 5 wherein the circuit comprises a second resistor coupled between the first end of the first resistor and the control node of the switch.

7. The device of claim 5 wherein the circuit comprises a capacitor coupled between the control node of the switch and a second end of the first resistor.

8. The device of claim 6 wherein the circuit comprises a diode coupled in parallel with the second resistor.

9. A device for protection against overvoltages in a power supply line, the device comprising:
    a breakover diode;
    an avalanche diode coupled in series with the breakover diode;
    a switch coupled in parallel with the breakover diode and the avalanche diode; and
    a circuit coupled across the avalanche diode and configured to control the switch.

10. The device of claim 9 wherein the avalanche diode has a breakdown voltage at least ten times smaller than a breakdown voltage of the breakover diode.

11. The device of claim 9 wherein the switch comprises at least one of a transistor and an insulated-gate bipolar transistor.

12. The device of claim 9 wherein the circuit comprises a first resistor coupled in parallel with the avalanche diode; and wherein a first end of the first resistor is coupled to a node between the breakover diode and the avalanche diode, and a control node of the switch.

13. The device of claim 12 wherein the circuit comprises a second resistor coupled between the first end of the first resistor and the control node of the switch.

14. The device of claim 12 wherein the circuit comprises a capacitor coupled between the control node of the switch and a second end of the first resistor.

15. A method for making a device for protection against overvoltages in a power supply line, the method comprising:
    coupling an avalanche diode in series with a breakover diode;
    coupling a switch in parallel with the breakover diode and the avalanche diode; and
    coupling a circuit across the avalanche diode and for controlling the switch.

16. The method of claim 15 wherein the avalanche diode has a breakdown voltage at least ten times smaller than a breakdown voltage of the breakover diode.

17. The method of claim 15 wherein the switch comprises at least one of a transistor and an insulated-gate bipolar transistor.

18. The method of claim 15 wherein the circuit comprises a first resistor coupled in parallel with the avalanche diode; and wherein a first end of the first resistor is coupled to a node between the breakover diode and the avalanche diode, and a control node of the switch.

19. The method of claim 18 wherein the circuit comprises a second resistor coupled between the first end of the first resistor and the control node of the switch.

20. The method of claim 18 wherein the circuit comprises a capacitor coupled between the control node of the switch and a second end of the first resistor.

* * * * *